United States Patent
Tsofe

(10) Patent No.: US 8,964,891 B2
(45) Date of Patent: Feb. 24, 2015

(54) ANTENNA SYSTEM CALIBRATION

(71) Applicant: Panasonic Avionics Corporation, Lake Forest, CA (US)

(72) Inventor: Yossi Tsofe, Zichron Yaaqov (IL)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 14/067,711

(22) Filed: Oct. 30, 2013

(65) Prior Publication Data

US 2014/0169509 A1    Jun. 19, 2014

Related U.S. Application Data

(60) Provisional application No. 61/738,833, filed on Dec. 18, 2012.

(51) Int. Cl.
| | |
|---|---|
| H04L 25/49 | (2006.01) |
| G01S 7/40 | (2006.01) |
| H01Q 3/26 | (2006.01) |
| H04B 17/00 | (2006.01) |
| H04L 1/00 | (2006.01) |

(52) U.S. Cl.
CPC .............. *H04L 1/0036* (2013.01); *H01Q 3/267* (2013.01); *H04B 17/00* (2013.01)
USPC ........................................................ 375/296

(58) Field of Classification Search
CPC .... H04B 17/0062; H04B 17/008; H01Q 3/26; H01Q 3/267
USPC ............................ 375/296, 297; 342/173, 174
See application file for complete search history.

(56) References Cited

U.S. PATENT DOCUMENTS

| | | | |
|---|---|---|---|
| 3,810,185 | A | 5/1974 | Wilkinson |
| 4,263,598 | A | 4/1981 | Bellee et al. |
| 4,486,758 | A | 12/1984 | de Ronde |
| 4,527,165 | A | 7/1985 | de Ronde |

(Continued)

FOREIGN PATENT DOCUMENTS

| | | |
|---|---|---|
| EP | 0 089 084 B1 | 9/1983 |
| EP | 0 123 350 B1 | 10/1984 |

(Continued)

OTHER PUBLICATIONS

Communication Pursuant to Article 94(3) EPC Appln. No. 04712141.3, Oct. 28, 2008.

(Continued)

*Primary Examiner* — Kevin Kim
(74) *Attorney, Agent, or Firm* — Brian Furrer

(57) ABSTRACT

A method for calibrating an antenna system having electronics and two or more passive antennas for connection to the electronics and two or more signal interfaces for use with a pilot signal. The method includes compensating for three major errors in order to find calibration offsets in a deterministic process. These errors are caused by differences between antenna interfaces, differences between signal interfaces and frequency margin, i.e., frequency offset, between main signal and accessory (pilot) signal. In the method, a calibration offset is initially determined that accounts for the errors caused by antenna and signal interfaces. Further refinement is performed by accounting for errors caused by the frequency margin between the main and accessory signals.

16 Claims, 7 Drawing Sheets

(56) References Cited

U.S. PATENT DOCUMENTS

| | | |
|---|---|---|
| 4,614,947 A | 9/1986 | Rammos |
| 4,647,938 A | 3/1987 | Roederer et al. |
| 4,679,051 A | 7/1987 | Yabu et al. |
| 4,801,943 A | 1/1989 | Yabu et al. |
| 5,089,824 A | 2/1992 | Uematsu et al. |
| 5,245,348 A | 9/1993 | Nishikawa et al. |
| 5,253,188 A | 10/1993 | Lee et al. |
| 5,258,250 A | 11/1993 | Shirai et al. |
| 5,309,162 A | 5/1994 | Uematsu et al. |
| 5,398,035 A | 3/1995 | Densmore et al. |
| 5,404,509 A | 4/1995 | Klein |
| 5,420,598 A | 5/1995 | Uematsu et al. |
| 5,508,731 A | 4/1996 | Kohorn |
| 5,512,906 A | 4/1996 | Speciale |
| 5,528,250 A | 6/1996 | Sherwood et al. |
| 5,537,141 A | 7/1996 | Happer et al. |
| 5,544,299 A | 8/1996 | Wenstrand et al. |
| 5,579,019 A | 11/1996 | Uematsu et al. |
| 5,596,336 A | 1/1997 | Liu |
| 5,678,171 A | 10/1997 | Toyama et al. |
| 5,712,644 A | 1/1998 | Kolak |
| 5,740,035 A | 4/1998 | Cohen et al. |
| 5,751,247 A | 5/1998 | Nomoto et al. |
| 5,764,199 A | 6/1998 | Ricardi |
| 5,767,897 A | 6/1998 | Howell |
| 5,781,163 A | 7/1998 | Ricardi et al. |
| 5,799,151 A | 8/1998 | Hoffer |
| 5,801,754 A | 9/1998 | Ruybal et al. |
| 5,823,788 A | 10/1998 | Lemelson et al. |
| 5,841,980 A | 11/1998 | Waters et al. |
| 5,861,881 A | 1/1999 | Freeman et al. |
| 5,872,545 A | 2/1999 | Rammos |
| 5,878,214 A | 3/1999 | Gilliam et al. |
| 5,880,731 A | 3/1999 | Liles et al. |
| 5,886,671 A | 3/1999 | Riemer et al. |
| 5,916,302 A | 6/1999 | Dunn et al. |
| 5,917,310 A | 6/1999 | Baylis |
| 5,929,819 A | 7/1999 | Grinberg |
| 5,961,092 A | 10/1999 | Coffield |
| 5,978,835 A | 11/1999 | Ludwig et al. |
| 5,982,333 A | 11/1999 | Stillinger et al. |
| 5,983,071 A | 11/1999 | Gagnon et al. |
| 5,991,595 A | 11/1999 | Romano et al. |
| 5,995,951 A | 11/1999 | Ferguson |
| 5,999,208 A | 12/1999 | Mcnemey et al. |
| 6,049,306 A | 4/2000 | Amarillas |
| 6,061,082 A | 5/2000 | Park |
| 6,061,440 A | 5/2000 | Delaney et al. |
| 6,061,716 A | 5/2000 | Moncreiff |
| 6,064,978 A | 5/2000 | Gardner et al. |
| 6,074,216 A | 6/2000 | Cueto |
| 6,078,948 A | 6/2000 | Podgorney et al. |
| 6,120,534 A | 9/2000 | Ruiz |
| 6,124,832 A | 9/2000 | Jeon et al. |
| 6,127,966 A * | 10/2000 | Erhage ............ 342/174 |
| 6,133,868 A | 10/2000 | Butler et al. |
| 6,160,520 A | 12/2000 | Muhlhauser et al. |
| 6,169,522 B1 | 1/2001 | Ma et al. |
| 6,184,828 B1 | 2/2001 | Shoki |
| 6,191,734 B1 | 2/2001 | Park et al. |
| 6,195,060 B1 | 2/2001 | Spano et al. |
| 6,204,823 B1 | 3/2001 | Spano et al. |
| 6,218,999 B1 | 4/2001 | Bousquet et al. |
| 6,249,809 B1 | 6/2001 | Bro |
| 6,256,663 B1 | 7/2001 | Davis |
| 6,259,415 B1 | 7/2001 | Kumpfbeck et al. |
| 6,297,774 B1 | 10/2001 | Chung |
| 6,304,861 B1 | 10/2001 | Ferguson |
| 6,331,837 B1 | 12/2001 | Shattil |
| 6,347,333 B2 | 2/2002 | Eisendrath et al. |
| 6,407,714 B1 | 6/2002 | Butler et al. |
| 6,442,590 B1 | 8/2002 | Inala et al. |
| 6,483,472 B2 | 11/2002 | Cipolla et al. |
| 6,486,845 B2 | 11/2002 | Ogawa et al. |
| 6,496,158 B1 | 12/2002 | Ksienski et al. |
| 6,578,025 B1 | 6/2003 | Pollack et al. |
| 6,624,787 B2 | 9/2003 | Puzella et al. |
| 6,657,589 B2 | 12/2003 | Wang et al. |
| 6,661,388 B2 | 12/2003 | Desargant et al. |
| 6,677,908 B2 | 1/2004 | Strickland |
| 6,707,432 B2 | 3/2004 | Strickland |
| 6,738,024 B2 | 5/2004 | Butler et al. |
| 6,765,542 B2 | 7/2004 | McCarthy et al. |
| 6,771,225 B2 | 8/2004 | Tits |
| 6,778,144 B2 | 8/2004 | Anderson |
| 6,792,448 B1 | 9/2004 | Smith |
| 6,822,612 B2 | 11/2004 | Takimoto et al. |
| 6,839,039 B2 | 1/2005 | Tanaka et al. |
| 6,861,997 B2 | 3/2005 | Mahon |
| 6,864,837 B2 | 3/2005 | Runyon et al. |
| 6,864,846 B2 | 3/2005 | King |
| 6,873,301 B1 | 3/2005 | Lopez |
| 6,897,806 B2 | 5/2005 | Toshev |
| 6,950,061 B2 | 9/2005 | Howell et al. |
| 6,999,036 B2 | 2/2006 | Stoyanov et al. |
| 7,061,432 B1 | 6/2006 | Hozouri |
| 7,253,777 B2 | 8/2007 | Blaschke et al. |
| 7,382,329 B2 | 6/2008 | Kim |
| 7,385,562 B2 | 6/2008 | Stoyanov et al. |
| 7,492,322 B2 | 2/2009 | Jung et al. |
| 7,595,762 B2 | 9/2009 | Mansour |
| 7,629,935 B2 | 12/2009 | Mansour et al. |
| 7,663,566 B2 | 2/2010 | Engel |
| 7,768,469 B2 | 8/2010 | Mansour et al. |
| 7,821,355 B2 | 10/2010 | Engel |
| 7,994,994 B2 | 8/2011 | Savage et al. |
| 7,994,998 B2 | 8/2011 | Engel |
| 7,999,750 B2 | 8/2011 | Mansour et al. |
| 8,185,045 B2 | 5/2012 | Mansour |
| 2001/0026245 A1 | 10/2001 | Cipolla et al. |
| 2002/0072955 A1 | 6/2002 | Brock |
| 2002/0128898 A1 | 9/2002 | Smith et al. |
| 2002/0194054 A1 | 12/2002 | Erengut |
| 2003/0067410 A1 | 4/2003 | Puzella et al. |
| 2003/0088458 A1 | 5/2003 | Afeyan et al. |
| 2003/0122724 A1 | 7/2003 | Shelley et al. |
| 2004/0178476 A1 | 9/2004 | Boyanov et al. |
| 2004/0233122 A1 | 11/2004 | Espenscheid et al. |
| 2005/0057396 A1 | 3/2005 | Boyanov |
| 2005/0146473 A1 | 7/2005 | Stoyanov et al. |
| 2005/0162305 A1* | 7/2005 | Wells ............ 342/357.02 |
| 2005/0259021 A1 | 11/2005 | Stoyanov et al. |
| 2005/0259201 A1 | 11/2005 | Hu et al. |
| 2006/0132372 A1 | 6/2006 | Jung et al. |
| 2006/0197713 A1 | 9/2006 | Mansour et al. |
| 2006/0244669 A1 | 11/2006 | Mansour et al. |
| 2007/0085744 A1 | 4/2007 | Engel |
| 2007/0146222 A1 | 6/2007 | Mansour |
| 2008/0007453 A1 | 1/2008 | Vassilakis et al. |
| 2011/0122016 A1* | 5/2011 | Lomes et al. ............ 342/174 |
| 2011/0133982 A1* | 6/2011 | Goshen et al. ............ 342/174 |
| 2012/0086612 A1* | 4/2012 | Linehan et al. ............ 343/703 |
| 2013/0079060 A1* | 3/2013 | Pivit et al. ............ 455/561 |
| 2014/0225768 A1 | 8/2014 | Engel et al. |

FOREIGN PATENT DOCUMENTS

| | | |
|---|---|---|
| EP | 0 481 417 B1 | 4/1992 |
| EP | 0 518 271 A1 | 12/1992 |
| EP | 0 520 424 A2 | 12/1992 |
| EP | 0 546 513 A1 | 6/1993 |
| EP | 0 557 853 A1 | 9/1993 |
| EP | 1 604 427 B1 | 2/2004 |
| EP | 2 290 382 A1 | 3/2011 |
| FR | 2 848 302 A1 | 6/2011 |
| JP | 62-173807 A | 7/1987 |
| JP | 63-108805 A | 5/1988 |
| JP | 63-171003 A | 7/1988 |
| JP | 63-174411 A | 7/1988 |
| JP | 02-137402 A | 5/1990 |
| JP | 03-247003 A | 11/1991 |
| JP | 06-069712 A | 3/1994 |
| JP | 06-237113 A | 8/1994 |
| JP | 08-321715 A | 12/1996 |

(56) References Cited

FOREIGN PATENT DOCUMENTS

| WO | WO 89/09501 A1 | 10/1989 |
|---|---|---|
| WO | WO 00/75829 A1 | 12/2000 |
| WO | WO 01/11718 A1 | 2/2001 |
| WO | WO 01/84266 A2 | 11/2001 |
| WO | WO 01/84266 A3 | 11/2001 |
| WO | WO 02/19232 A1 | 3/2002 |
| WO | WO 02/057986 A2 | 7/2002 |
| WO | WO 02/097919 A1 | 12/2002 |
| WO | WO 02/103842 A1 | 12/2002 |
| WO | WO 03/052868 A1 | 6/2003 |
| WO | WO 03/096576 A1 | 11/2003 |
| WO | WO 2004/042492 A2 | 5/2004 |
| WO | WO 2004/042492 A3 | 5/2004 |
| WO | WO 2004/075339 A2 | 9/2004 |
| WO | WO 2004/079859 A1 | 9/2004 |
| WO | WO 2004/079861 A1 | 9/2004 |
| WO | WO 2004/097972 A1 | 11/2004 |
| WO | WO 2005/004284 A1 | 1/2005 |
| WO | WO 2005/067098 A1 | 7/2005 |
| WO | WO 2007/046055 A2 | 4/2007 |
| WO | WO 2007/063434 A2 | 6/2007 |

OTHER PUBLICATIONS

Communication Pursuant to Article 94(3) EPC Appln. No. 06809614.8, Aug. 25, 2008.
Communication Pursuant to Article 94(3) EPC Appln. No. 06809614.8, Jul. 22, 2009.
Communication Pursuant to Article 94(3) EPC Appln. No. 06809614.8, Feb. 16, 2010.
Communication Pursuant to Article 94(3) EPC Appln. No. 06809615.5, Sep. 4, 2009.
Communication Pursuant to Article 94(3) EPC Appln. No. 06809615.5, Mar. 1, 2010.
Communication Pursuant to Article 96(2) EPC Appln. No. 04712141.3, Oct. 4, 2006.
Communication Pursuant to Rules 161 and 162 EPC Appln. No. 06809614.8, May 26, 2008.
Response to Communication Pursuant to Article 94(3) EPC of Aug. 25, 2008, Appln. No. 06809614.8, Feb. 10, 2009.
Response to Communication Pursuant to Article 94(3) EPC of Feb. 16, 2010, Appln. No. 06809614.8, May 31, 2010.
Response to Communication Pursuant to Article 94(3) EPC of Jul. 22, 2009, Appln. No. 06809614.8, Nov. 9, 2009.
Response to Communication Pursuant to Article 94(3) EPC of Mar. 1, 2010, Appln. No. 06809615.5, Jun. 28, 2010.
Response to Communication Pursuant to Article 94(3) EPC of Sep. 4, 2009, Appln. No. 06809615.5, Dec. 27, 2009.
Response to Communication Pursuant to Rules 161 and 162 EPC dated May 26, 2008, Appln. No. 06809614.8, Jul. 14, 2008.
Supplementary European Search Report and the European Search Opinion, Appln. No. 06809615.5, Jul. 6, 2009.
Supplementary European Search Report Appln. No. 04712141.3, Dec. 23, 2005.
Extended European Search Report, EPC Appln. No. 13193527.2, Apr. 2, 2014.
Office Action, Appln. No. 154525, May 20, 2010.
Office Action, Appln. No. 154525, Feb. 25, 2007.
Office Action, Appln. No. 154525, Mar. 19, 2008.
Office Action, Appln. No. 154525, Nov. 23, 2008.
Office Action, Appln. No. 171450, May 2, 2010.
Office Action, Appln. No. 171450, May 3, 2009.
Response to Notification of Reasons of Rejection of Mar. 26, 2010, Appln. No. 2006-502642, Jun. 20, 2010.
Translation of Notification of Reasons of Rejection, Appln. No. 2006-502642, Jan. 21, 2009.
Translation of Notification of Reasons of Rejection, Appln. No. 2006-502642, Mar. 26, 2010.
International Preliminary Report on Patentability, PCT/IB2006/053805, Mar. 14, 2008.
International Preliminary Report on Patentability, PCT/IB2006/053806, Jan. 22, 2009.
International Preliminary Report on Patentability, PCT/IL2004/000149, May 27, 2005.
International Preliminary Report on Patentability, PCT/IL2005/000020, Jul. 10, 2009.
International Search Report and Written Opinion of the International Searching Authority, PCT/IB2006/53806, Jul. 30, 2008.
International Search Report, PCT/IB2006/053805, Oct. 9, 2007.
International Search Report, PCT/IL2004/000149, Oct. 14, 2004.
International Search Report, PCT/IL2005/000020, Apr. 20, 2005.
Written Opinion From the International Searching Authority, PCT/EP2006/053805, Oct. 9, 2007.
Written Opinion From the International Searching Authority, PCT/IL2005/000020, Apr. 20, 2005.
Written Opinion From the International Searching Authority, PCT/IL2004/000149, Oct. 14, 2004.
Notice of Allowance, U.S. Appl. No. 10/546,264, Aug. 4, 2009.
Notice of Allowance, U.S. Appl. No. 11/477,600, Apr. 2, 2010.
Office Action, U.S. Appl. No. 10/546,264, Dec. 24, 2008.
Office Action, U.S. Appl. No. 11/440,054, Feb. 24, 2009.
Office Action, U.S. Appl. No. 11/477,600, Feb. 5, 2009.
Office Action, U.S. Appl. No. 11/477,600, Nov. 30, 2009.
Office Action, U.S. Appl. No. 11/580,306, Jul. 14, 2008.
Response to Jul. 14, 2008 Office Action, U.S. Appl. No. 11/580,306, Dec. 15, 2008.
Response to Dec. 24, 2008 Office Action, U.S. Appl. No. 10/546,264, Mar. 24, 2009.
Response to Feb. 24, 2009 Office Action, U.S. Appl. No. 11/440,054, Mar. 23, 2009.
Response to Feb. 5, 2009 Office Action, U.S. Appl. No. 11/477,600, Aug. 5, 2009.
Response to Nov. 30, 2009 Office Action, U.S. Appl. No. 11/477,600, Apr. 8, 2010.
Declaration of Messrs. Micha Lawrence and David Levy (Jan. 10, 2006) including Exhibits, Sep. 2003 Public Display in Seattle, Washington, 24 pages.
Felstead, "Combining Multiple Sub-Apertures for Reduced-Profile Shipboard Satcom-Antenna Panels", Communications Research Centre, Ottawa, Canada, 2001, pp. 665-669.
Ito et al., "A Mobile 12 GHz DBS Television Receiving System", IEEE Transactions on Broadcasting, Mar. 1989, vol. 35, No. 1, pp. 56-61.
LeVine et al., "Component Design Trends—Dual-Mode Horn Feed for Microwave Multiplexing," Electronics, Sep. 1954, vol. 27, pp. 162-164.
MR-Live "MR-Live-Take the Pulse of Your Market", Product Overview, 2001, 11 Pages.
NetOnCourse, "Harnessing the Value of Mass E-Gathering", www.netoncourse.com, 2000, 12 Pages.
NetOnCourse, "NetOnCourse. Masters of Future Think", 1999, 4 Pages.
Peeler et al., "A Two-Dimensional Microwave Luneberg Lens", I.R.E. Transactions—Antennas and Propagation, 1953, pp. 12-23.
Peeler et al., "Microwave Stepped-Index Luneberg Lenses", IRE Transactions on Antennas and Propagation, 1957, pp. 202-207.
Peeler et al., "Virtual Source Luneberg Lenses", I-R-E Transactions—Antennas and Propagation, 1953, pp. 94-99.
Stuchly et al., "Wide-Band Rectangular to Circular Waveguide Mode and Impedance Transformer," IEEE Transactions on Microwave Theory and Techniques, May 1965, vol. 13, pp. 379-380.

* cited by examiner

ANTENNA SYSTEM CALIBRATION

CROSS-REFERENCE TO RELATED APPLICATIONS

This application claims the benefit of U.S. Provisional Application Ser. No. 61/738,833 filed on Dec. 18, 2012, the disclosure of which is hereby incorporated herein by reference in its entirety.

TECHNICAL FIELD

The present invention relates to antenna calibration, and more particularly to calibration of an antenna system having a plurality of antennas.

BACKGROUND

In antenna systems defining an array of two or more antennas there are differences among the antennas. In particular, propagation pathways differ slightly between antennas, affecting the amplitude and phase of signals being received and transmitted with the antennas. Traditionally, the differences have been accounted for by determining calibration offsets for the antennas. Specifically, a known signal is received and/or transmitted by each of the antennas and the differences in resulting output from the antennas is compared with one another. Based on the differences, calibration offsets are defined to improve performance of the system.

Conventionally, the calibration offsets are determined by an iterative process. The process generally includes receiving and transmitting signals with the antennas, measuring the result, and making adjustments, i.e., modifying calibration offsets. This is repeated until differences in output have been reduced to an acceptable level and nominal best performance achieved. The system is ordinarily tuned by using an accessory or pilot signal. However, best performance is desired for the main signal, not the pilot signal. Therefore, an offset is applied to the pilot signal, and checking for improvement is performed with the main signal. As will be appreciated by those skilled in the art, it is a trial and error procedure, and can be quite time consuming and labor intensive.

Moreover, calibration offsets tend to be heavily dependent upon frequency. For antennas systems required for use over a large frequency range, the foregoing process of trial and error can become costly in terms of the time necessary to complete the process.

In addition, the calibration offsets are typically determined before an antenna system has been installed for use. After the antenna system has been installed, environmental factors can cause differences to change between the antennas, rendering the previously determined calibration offsets to be far from optimal.

An embodiment of a method or process in accordance with the present invention addresses some of the drawbacks of a trial and error procedure. In particular, it provides for a more automated and deterministic procedure that is less time consuming and can be more readily preformed over a wide frequency range. Further, determination of calibration offsets can be performed at least in part after installation of an antenna system.

SUMMARY OF THE INVENTION

In one aspect, a method is provided for calibrating an antenna system having electronics and a pair of passive antennas for connection to the electronics. Modification control is applied to the electronics based upon pilot signals injected into the electronics through a pair of signal interfaces when the electronics is being operated. The method includes receiving a signal with the passive antennas and determining amplitude and phase differences in the received signal between the first and second passive antennas.

The method also includes injecting a test signal to one of the signal interfaces and then the other and determining the amplitude and phase differences in the test signal between when it is injected to the one of the signal interfaces and the other. In the method, this is performed for determining a calibration offset that is equal to the determined amplitude and phase differences in the test signal between when it is injected to the one of the signal interfaces and the other, subtracted from the determined amplitude and phase differences in the received signal between the passive antennas.

The calibration offset is refined by accounting for frequency margin. To account for the frequency margin, the method includes operating the electronics with the above-determined calibration offset in the absence of input from the antennas. The next step is injecting a pilot signal having a first frequency and applying modification control. Thereafter, there is a ceasing of modification control and changing of the pilot signal to a second frequency offset from the first frequency and switching the pilot signal from one signal interface to the other. Then, the amplitude and phase differences at an output of the electronics is determined between when the pilot signal with the second frequency is switched from the one signal interface to the other. Finally, the method includes using these differences as the calibration offset.

The calibration offset is generally frequency dependent. The method therefore includes repeating the foregoing steps over a plurality of frequencies. For an antenna system intended for receiving signals from a Ku band satellite, the plurality of frequencies ranges from 10.70 GHz to 12.75 GHz inclusively.

The initial step of the method, i.e., receiving a signal with the passive antennas and determining amplitude and phase differences in the received signal between the first and second passive antennas, is performed without the passive antennas connected to the electronics. It is also performed in an anechoic environment.

The above described steps are directed to reception. The method also includes steps directed to calibrating an antenna system for transmission. The first step of the method for calibrating for transmission is supplying a signal to the passive antennas and determining amplitude and phase differences between transmissions of the first and second antennas. The method includes passing a test signal through one of the signal interfaces and then the other and determining the amplitude and phase difference in the test signal between when it is passed through the one of the signal interfaces and the other.

Thereafter, a calibration offset is determined. The calibration offset is determined as being equal to the amplitude and phase difference in the test signal between when it is passed through the one of the signal interfaces and the other, subtracted from the determined amplitude and phase difference in the transmissions between the first and second antennas.

In transmission, as in reception, each passive antenna is for connection to electronics in which modification control is applied to the electronics based upon pilot signals injected into the electronics and passing through the signal interfaces when the electronics is being operated. Accordingly, the method accounts for frequency difference between the pilot signal and the main signal.

In this regard, the method further includes operating the electronics with the above-determined calibration offset determined and in the absence of input from the antennas. The method then includes injecting pilot signals having a first frequency, applying modification control and thereafter ceasing modification control.

After cessation of modification control, the method provides for changing the pilot signal to a frequency offset from the first frequency. The next step is determining the amplitude and phase differences between when the pilot signal with the second frequency passes through the electronics and the first signal interface, and the electronics and the second signal interface. The differences resulting from the foregoing determining the amplitude and phase differences are used as the calibration offset.

The offset between the first and second frequencies of the pilot signal is equal to the frequency offset between the main signal and the pilot signal when the antenna system is being used. Thus, the method accounts for the frequency offset between the main signal and accessory signal (pilot signal). In particular, the frequency offset is approximately equal to 50 MHz.

As stated earlier, calibration offsets are generally frequency dependent. Hence, the method in transmission further includes repeating the foregoing steps over a plurality of frequencies. As the antenna system of the preferred embodiment is transmitting over a frequency range from 14 GHz to 14.5 GHz inclusively, the plurality of frequencies is likewise from 14 GHz to 14.5 GHz inclusively.

The first step of the method, i.e., supplying a signal to the passive antennas and determining amplitude and phase differences between transmissions of the first and second antennas, is performed without the passive antennas connected to the electronics. It is also performed in an anechoic environment.

Other aspects and advantages will become apparent from the following description, taken in conjunction with the accompanying drawings, illustrating by way of example the principles of the invention.

BRIEF DESCRIPTION OF THE DRAWINGS

The drawing figures are not necessarily to scale and do not represent every feature, but are schematic diagrams to enable those of ordinary skill in the art to make and use the invention without undue experimentation and do not limit the scope of the claims. Embodiments in accordance with the invention and advantages will therefore be understood by those of ordinary skill in the art by reference to the detailed description below together with the following drawings figures, wherein:

DETAILED DESCRIPTION OF PREFERRED EMBODIMENTS

Figure 1:
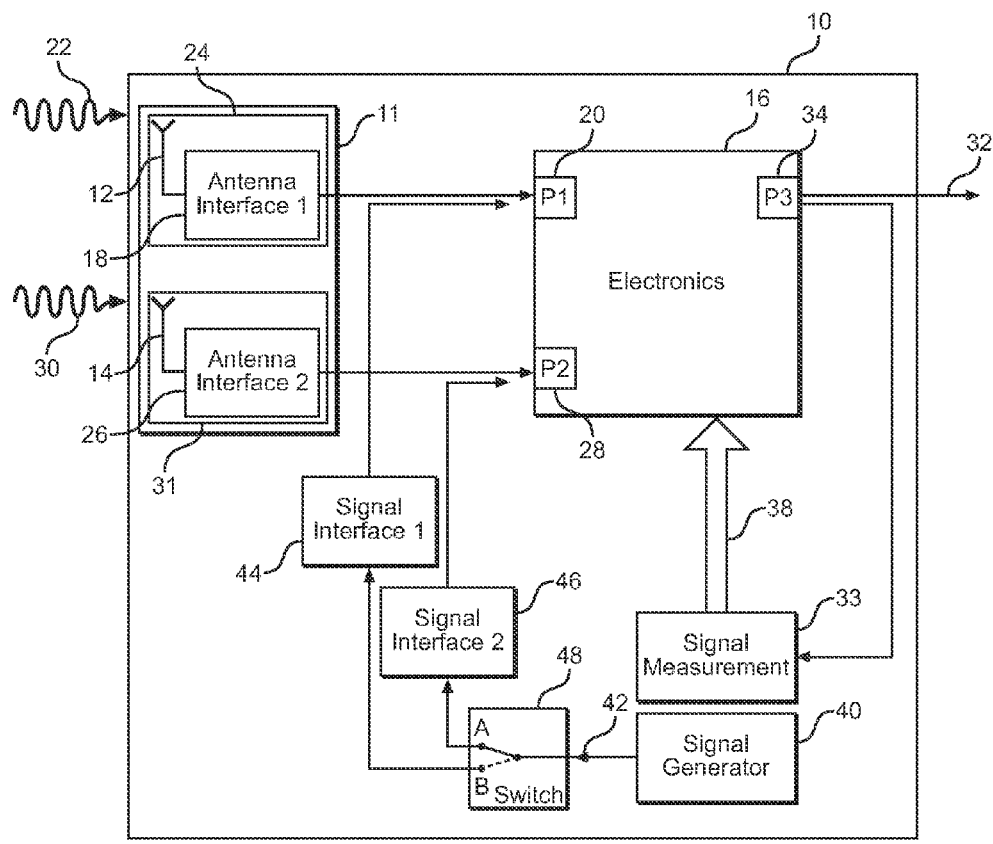
FIG. 1 is a schematic illustration of an exemplary antenna system for explanation of a preferred embodiment of an antenna calibration method in accordance with the present invention when receiving signals with the system.

FIG. 1 is a schematic diagram illustrating an exemplary antenna system 10 for calibration using a preferred embodiment of a process or method in accordance with the present invention. The antenna system 10 includes an antenna array or panel 11 defining a first antenna 12 and second antenna 14. Preferably, each antenna 12 and 14 is formed from a plurality of smaller elements arranged in an array or matrix on a panel for presenting a low profile. An example of an antenna formed from an array of smaller elements is disclosed for example in U.S. Pat. No. 7,994,998 to Engel, issued Aug. 9, 2011, which is herein incorporated by reference in its entirety. Another example is U.S. Pat. No. 7,629,935 to Mansour et al., issued Dec. 8, 2009, which is herein incorporated by reference in its entirety.

Figure 3:
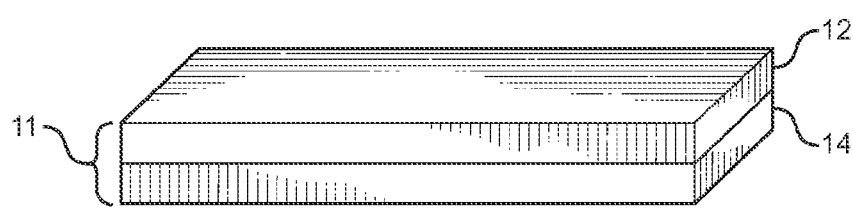
FIG. 3 is schematic perspective view of an antenna array or panel for illustrating the physical arrangement thereof.

In particular, each antenna 12 and 14 is formed from a plurality of elements. Each element is wideband and can transmit and receive concurrently over an inclusive range from 10.7 GHz to 14.5 GHz. While the antennas 12 and 14 are illustrated as separate from another in FIG. 1, in use the antennas 12 and 14 overlay one another as shown in FIG. 3. That is, a single panel is formed with one antenna 12 or 14 overlaid on the other antenna 12 or 14. More particularly, the panel includes an upper antenna 12 or 14, overlying a lower antenna 12 or 14. The upper antenna 12 or 14 collects only one type of polarized signals, either horizontal or vertical. If the upper antenna 12 or 14 collects only horizontally polarized signals, then the lower antenna 12 or 14 collects only vertically polarized signals. The converse is also true. If the upper antenna 12 or 14 collects only vertically polarized signals, then the lower antenna 12 or 14 collects only horizontally polarized signals.

Forming the antennas 12 and 14 in an array on a panel with one antenna 12 or 14 layered on the other provides a lower profile. A lower profile is advantageous for mobile use, such as on a vehicle. Specifically, the lower profile makes it easier to place the antenna array 10 in an aerodynamic structure, such as a fairing or radome to reduce frictional losses as the vehicle travels through a medium, such as air or water. FIG. 3 illustrates the antennas 12 and 14 as having a rectangular geometry when viewed from top. The figure is a perspective schematic for illustrative purposes and the antennas 12 and 14 have other geometries depending upon the particular application.

The antenna system 10 includes electronics 16. A first antenna interface 18 connects the first antenna 12 to a first port 20 of the electronics 16 via a waveguide (not shown). When the first antenna 12 receives a signal 22, the signal 22 is communicated via the waveguide and input through the port 20 into the electronics 16. The waveguide is designed and sized to communicate signals in the Ku band frequency range with low loss. The first antenna 12 combined with its antenna interface 18 is referred to herein as the first passive antenna 24.

A second antenna interface 26 connects the second antenna 14 to a second port 28 of the electronics 16. In particular, the second antenna interface 26 includes a waveguide. When the second antenna 14 receives a signal 30, the waveguide of the second antenna interface 26 communicates the received signal to a second port 28 of the electronics 16. The second antenna 14 combined with its antenna interface 26 is referred to herein as the second passive antenna 31.

The electronics 16 combine and process the signals input from the antenna interfaces 18 and 26 and provide a signal corresponding to that at a lower frequency and make an output signal 32 available at a third port 34. More particularly, the electronics 16 includes a low-noise block downconverter, commonly referred to as an LNB, for transferring or converting a higher frequency signal to a lower frequency in the L-band range. The function is to provide Ku-band to L-band downconversion of received signals from a communication satellite to a digital modem (not shown). The modem is for providing data connectivity for passengers in a vehicle carrying the antenna system 10.

A sampler or signal measurement apparatus 33 is used to measure or sample the output signal 32. Based upon the sampled or measured output signal 32, modification control 38 is applied to the electronics 16. In particular, the antenna system 10 includes a signal generator 40. The signal generator 40 produces a low level accessory or pilot signal 42. The pilot signal 42 is at a frequency offset from the main signal, i.e., the signals 22 and 30 being received by the antennas 12 and 14. The pilot signal 42 is used in the antenna system 10 to compensate for hardware variations. Compensation for hardware variations is performed continuously according to pilot signal measurements by changing the transfer function in the electronics 16. More particularly, the antenna system 10 is monitored according to pilot signal measurements. It is assumed that measurements indicating modification control 38 based on pilot signal measurements will also benefit reception of signals from the satellite.

Errors are caused in the antenna system 10 by at least three factors. First, there are differences between the passive antennas 24 and 31, especially with respect to the antenna interfaces 18 and 26. Second, there are differences in the path followed by the pilot signal 42. Third, there is a difference in the frequency between the pilot signal 42 and that of the signals being received from a satellite.

Compensation is performed at least in part by providing a calibration offset for the two passive antennas 24 and 31. A first embodiment of a process or method in accordance with the present invention includes accounting for such differences between the passive antennas 24 and 31.

Figure 4:
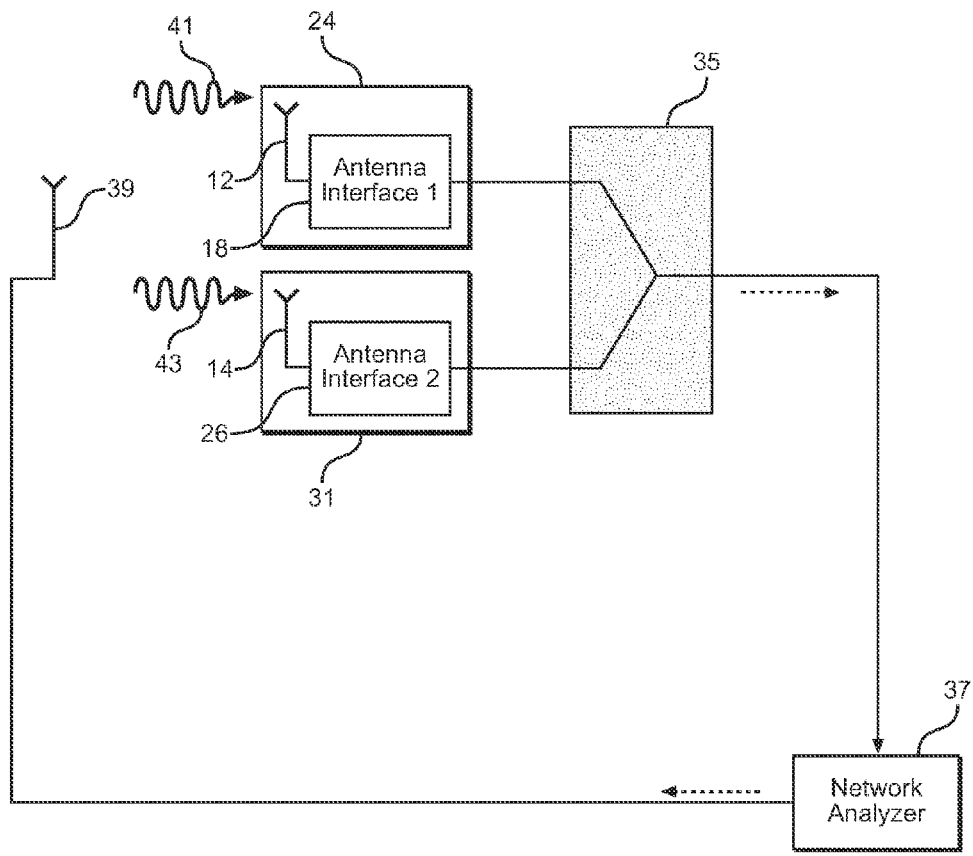
FIG. 4 is a schematic illustration of a test chamber arrangement for reception by antennas from the system of FIG. 1.

The first step is receiving a signal with the antennas 12 and 14 and determining amplitude and phase differences in the resulting output. This is done before the antennas 12 and 14 are assembled into the system 10, such as in a test chamber arrangement as schematically illustrated in FIG. 4. In particular, the passive antennas 24 and 31 are used. More particularly, the antennas 12 and 14 with the antenna interfaces 18 and 26 combined with the RF combiner 35. External measurement equipment, such as a network analyzer 37, is connected to the RF combiner 35 and used to measure the amplitude and phase differences of signals 41 and 43 received by the antennas 12 and 14. A horn antenna 39 connected to the network analyzer 37 is used to transmit the signals 41 and 43. The polarization of the horn antenna 39 can be controlled. Horizontal polarization is used to measure only one of the signals 41 or 43 and the other signal of the two will be approximately null. Vertical polarization is used to null out the other signal 41 or 43 and measure the other signal of the two. In this way, amplitude and phase differences between the antenna interfaces 18 and 26 can be isolated. Hence, the amplitude and phase differences will be due substantially only to propagation path differences. Since the calibration offset is frequency dependent, the first step is performed over the range of frequencies for which antennas 12 and 14 are expected to be used.

As described previously, the antennas 12 and 14 are designed to transmit and receive signals from communication satellites operating in the Ku band. Specifically, receive signals over a frequency range from 10.70 GHz to 12.75 GHz inclusively. Amplitude and phase differences are preferably determined at an increment of about 5 MHz over this frequency range.

The test chamber preferably provides an isolated environment, such as an anechoic chamber to minimize reflections and extraneous external signals that could cause interference. As the antenna system 10 is intended for communication from the earth to a satellite, the test signal is directed towards the antennas 12 and 14 in a manner to simulate signals arriving from a long distance away, such as from a satellite in geosynchronous orbit to a location well within the earth's atmosphere, e.g., to a terrestrial vehicle. A technique for simulating signals arriving from a long distance away in a compact range is to reflect the test signal from a structure having a broad parabolic surface towards the antennas 12 and 14. The result is to produce a nearly flat wave front arriving at the position of the antennas 12 and 14. Alternatively, a far field range may used.

The second step of the process or method is to determine pilot signal differences. This is done prior to connection of the passive antennas 24 and 31, such as in the arrangement shown in FIG. 5. In particular, this arrangement includes the signal interfaces 44 and 46 a switch 48, a network analyzer 37, and a waveguide adaptor or jig 49. The ports 20 and 28 and the electronics 16 are not used. The network analyzer 37 is used to measure differences between the two signal interfaces 44 and 46. More particularly, measurement is done apart from when the system 10 is fully assembled and when the low-noise block downconverter (LNB) of the electronics 16 is not connected to the antennas 12 and 14.

Figure 5:
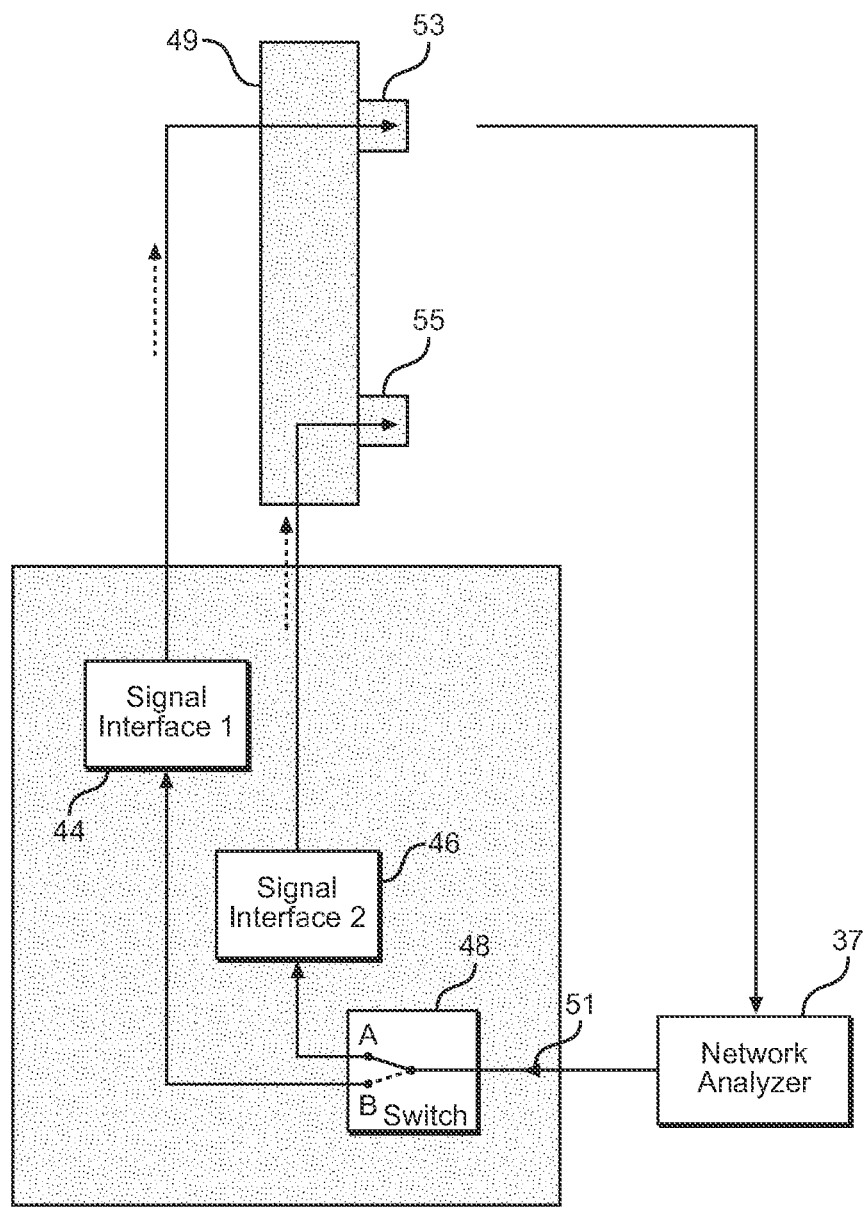
FIG. 5 is a schematic illustration of an arrangement for injection of a reception pilot signal through signal interfaces of the system of FIG. 1.

In the arrangement of FIG. 5, the network analyzer 37 is used to inject a test signal 51 through the switch 48 to one of the signal interfaces 44 or 46. The signal 51 is transmitted back to the network analyzer 37 through one of the ports 53 or 55 of the jig 49 via a cable. This measurement is used as a reference level for a subsequent measurement. In the subsequent measurement, the switch 48 is changed to the other signal interface 44 or 46 and the cable connected to the other port 53 or 55 of the jig 49. The subsequent measurement is compared to the previous measurement (the reference level) and the difference stored as the difference between the signal interfaces 44 and 46. It is performed over the same frequency range as the first part of the process, using the same frequency increment.

As described earlier, the pilot signal is at a frequency offset from the signal being received by the antennas 12 and 14. Preferably, the offset is about 50 MHz from the frequency of the signal being received by the antennas 12 and 14. More preferably, the offset is downward from the frequency of the signal being received by the antennas 12 and 14.

Thereafter, the method determines a calibration offset. The calibration offset is equal to the determined amplitude and phase differences between the signal interfaces 44 and 46, subtracted from the determined amplitude and phase differences between the passive antennas 24 and 31. The calibration offset is determined over the reception frequency range intended for use by the antenna system 10 using the above-described frequency increment. That is, a calibration offset is determined at about an increment of 50 MHz over the intended frequency range. As described above, the antennas are designed to transmit and receive signals in the Ku band, i.e., from 10.70 GHz to 12.75 GHz inclusively. Hence, a calibration offset is determined at each of 10.725 GHz, 10.775 GHz, 10.825 GHz and so on until 12.725 GHz is reached. In particular, calibration slots are determined ranging from 10.70 GHz to 10.75 GHz, 10.75 GHz to 10.80 GHz, 10.80 to 10.85 GHz and so on. The calibration offsets are determined for the center frequency of each slot (10.725 GHz, 10.775 GHz, 10.825 GHz and so on until 12.725 GHz is reached).

The starting point of the method can be thought of as determining the differences between the antenna interfaces 18 and 26 and the signal interfaces 44 and 46. Once the differences have been determined, the method includes allowing the system 10 to converge at the main signal frequency, while compensating for errors according to pilot signal measurements. In particular, the electronics 16 are operated such that it uses the previously determined calibration offsets and in the absence of input from the antennas 12 and 14. Only a pilot signal 42 is injected, without a frequency offset. Upon completion of this convergence, a switch to passive mode is made. That is, there is no more compensating for errors and therefore the electronics 16 remains constant. The next part of the method is to change the pilot signal frequency to its ordinary value, typically 50 MHz below the main signal. The last part is measuring the difference between the pilot signals that are obtained by this modification, i.e., switch to passive mode and changing frequency, and storing these differences as the calibration offsets to be used thereafter. The pilot signals 42 are injected in the absence of received signals from the antennas 12 and 14.

As described previously, differences or errors between the passive antennas 24 and 31 are determined. In addition, difference or errors between the pilot signal interfaces 44 and 46 are determined. The latter subtracted from the former is used as an initial calibration offset and stored. As the differences or errors are frequency dependent, initial calibration offsets over the frequency range of intended use are established.

Thereafter, the calibration offsets are stored and recalled for the particular frequency at which the antenna system 10 is operating, i.e., according to the main signal frequency. When the antenna system 10 is operating, the switch 48 switches the pilot signal 42 from one pilot signal interface 44 to the other 46 and measures the differences in phase and amplitude at the port 34 from the electronics 16. However, in operation the pilot signal 42 has an offset from the main signal frequency. Thus, the initially determined calibration offsets are refined. First, the antenna system 10 is operated as usual in the absence of signals from the passive antennas 24 and 31 and allowed to recall and use the initially determined calibration offsets according to frequency of the pilot signal 42. That is, the electronics 16 are in active mode. The mode is thereafter changed to passive and the pilot signal 42 changed to a second frequency according to its usual offset (50 MHz below the main signal frequency or the first frequency of the pilot signal 42 in this situation). The phase and amplitude differences thereafter resulting at the port 34 (electronics output) between when the switch 48 switches the pilot signal with its usual offset (second frequency) between the signal interfaces 44 and 46 is thereafter stored as the final calibration offset.

In summary, the method for calibration accounts for three kinds of errors in the antenna system 10. First, the method accounts for differences or errors between the passive antennas 24 and 31, such as in the antenna interfaces 18 and 26 and the antennas 12 and 14. Second, it accounts for errors or differences between pilot signal interfaces 44 and 46. Third, it accounts for errors caused by the pilot signal 42 being at a frequency offset from that being transmitted by the satellite.

Figure 2:
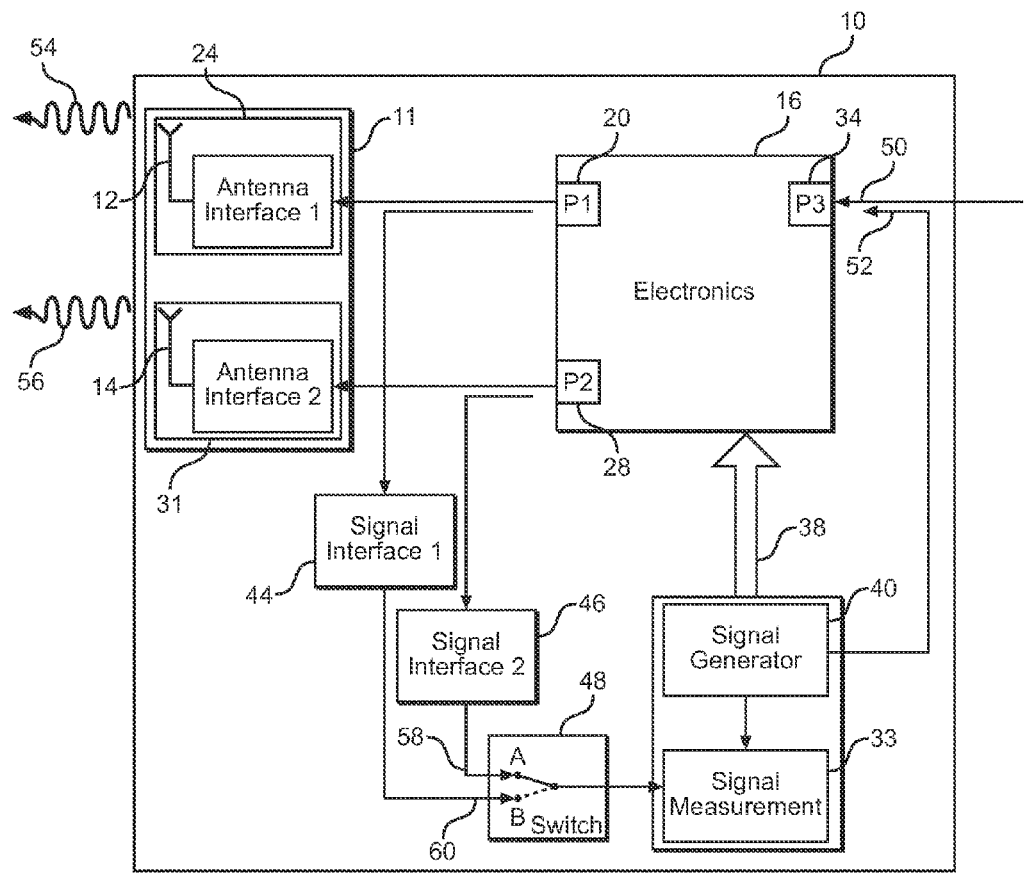
FIG. 2 is a schematic illustration of the antenna system of FIG. 1 for explanation of a preferred embodiment of an antenna calibration method in accordance with the present invention when transmitting signals with the system.

The previous description regarding FIG. 1, described calibrating the antenna system 10 with respect to reception by the antennas 12 and 14. FIG. 2 in contrast illustrates a preferred embodiment or method for calibration with respect to transmission by the antennas 12 and 14. Many of the components illustrated in FIG. 2 are the same as in FIG. 1 and identical reference numerals are used in FIG. 2 as in FIG. 1 to designate the same or substantially identical components. However, there are some differences between FIGS. 1 and 2.

In that regard, FIG. 2 illustrates the antenna system 10 having the antenna array or panel 11. As described earlier, the antenna panel 11 defines a first antenna 12 and a second antenna 14 and the antenna system 10 includes the electronics 16. In addition to the low-noise block downconverter described above, the electronics 16 includes a block up converter. A block up converter is commonly abbreviated as a BUC. The block upconverter in the antenna system 10 transfers or converts a lower frequency signal from the L-band range to a higher frequency signal in the Ku band for transmission from the antennas 12 and 14.

When the antenna system 10 is in use for transmission, a signal 50 for transmitting by the antennas 12 and 14 is supplied to the electronics 16. The signal 50 is a signal in the L-band and is input for example, from a digital modem. Each of the antennas 12 and 14 respectively transmit a signal 54 and 56 in accordance with the signal 50 that each antenna 12 and 14 receives via its respective antenna interface 18 and 26.

Modification control 38 is applied based on pilot signal measurement. In particular, the signal generator 40 supplies a pilot signal 52 at a frequency offset to the electronics 16. The pilot signal 52 is upconverted by the electronics 16 and output at ports 20 and 28 respectively to the signal interfaces 44 and 46. A switch 48 is used to switch between the signals 58 and 60 to provide a sampled signal to the signal measurement device 33. Based upon pilot signal measurement, modification control 38 is applied. While the switch 48 has been schematically illustrated as having a mechanical appearance, the switch 48 is electronic and switches signals on the order of milliseconds.

Figure 6:
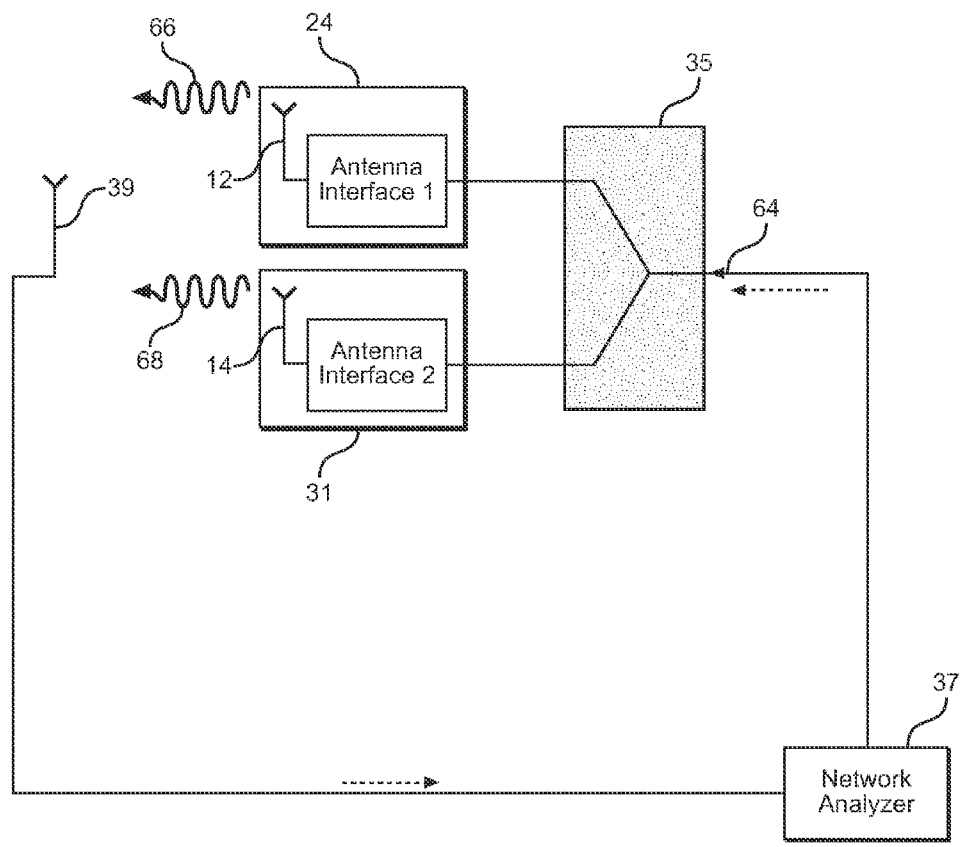
FIG. 6 is a schematic illustration of a test chamber arrangement for transmission by antennas from the system of FIG. 2.

The first step of the method for calibration in transmission is preferably performed in a test chamber arrangement as schematically illustrated in FIG. 6. The passive antennas 24 and 31 are connected to an RF combiner 35. The RF combiner 35 connects to a network analyzer 37, which supplies a signal 64 in the Ku band range for transmission by the antennas 12 and 14. Each antenna 12 and 14 transmits a signal 66 and 68 in accordance with the signal 64 from the network analyzer 37. The signals 66 and 68 from the antennas 12 and 14 are received with a horn antenna 39. Based upon the received signals, the horn antenna 39 provides input to the network analyzer 37. Hence, the amplitude and phase differences will be due substantially only to propagation path differences. Since the calibration offset is frequency dependent, this first step is performed over the range of frequencies for which antennas 12 and 14 are expected to be used for transmission, i.e., from 14 GHz to 14.5 GHz inclusively.

Determining amplitude and phase differences between transmitted signals 66 and 68 of the first and second antennas 12 and 14 is done in an isolated environment, such as in an anechoic chamber as described earlier. In a compact range, the signals 66 and 68 are reflected first from a large parabolic reflector as described previously, before reception with the horn antenna 39. The reflection simulates signals arriving from a long distance away, such as at a satellite in geosynchronous orbit from an aircraft well within the earth's atmosphere, i.e., from a terrestrial vehicle. Alternatively, a far field range may be used.

The next step is to determine pilot signal differences. This is performed prior to connection of the passive antennas 24 and 31, such as in the arrangement shown in FIG. 7. This arrangement includes the signal interfaces 44 and 46, a switch 48, a network analyzer 37, and a waveguide adaptor or jig 49. The network analyzer 37 is used to measure differences between the two signal interfaces 44 and 46. More particularly, measurement is done apart from when the system 10 is fully assembled and when the electronics 16 is not connected to the antennas 12 and 14.

Figure 7:
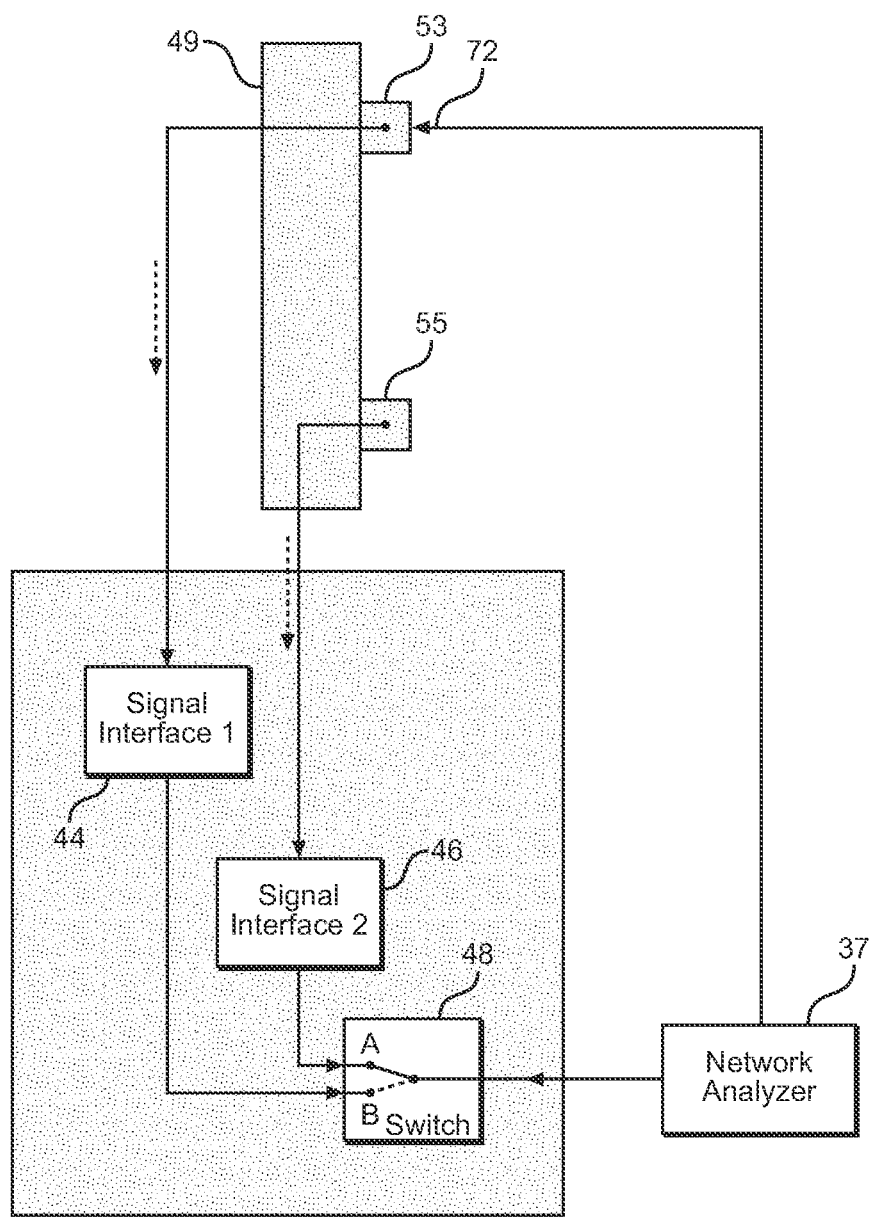
FIG. 7 is a schematic illustration of an arrangement for injection of a transmission pilot signal through signal interfaces of the system of FIG. 2.

In the arrangement of FIG. 7, the network analyzer 37 is used to inject a test signal 72 through one of the ports 53 or 55 of the jig 49 via a cable. The signal 72 is routed through one of the signal interfaces 45 or 46 and back to the network analyzer 37 through the switch 48. The network analyzer 37 measures the received signal. In particular, this measurement is used as a reference level for a subsequent measurement. In the subsequent measurement, the switch 48 is changed to the other signal interface 44 or 46 and the cable connected to the other port 53 or 55 of the jig 49. The subsequent measurement is compared to the previous measurement (the reference level) and the difference stored as the difference between the signal interfaces 44 and 46. It is performed over the frequency range for which the antenna system 10 is for sending transmissions, i.e., from 14 GHz to 14.5 GHz inclusively.

Thereafter, the method determines a calibration offset. The calibration offset is equal to the determined amplitude and phase differences between the signal interfaces 44 and 46, subtracted from the determined amplitude and phase differences between the passive antennas 24 and 31. The calibration offset is determined over the frequency range intended for use by the antenna system 10 using the above-described frequency increment. That is, a calibration offset is determined at about an increment of 50 MHz over the intended frequency range. As described above, the antennas are designed to transmit signals in the Ku band, i.e., from 14 GHz to 14.5 GHz inclusively. Hence, a calibration offset is determined at each of 14.025 GHz, 14.075 GHz, 14.125 GHz and so on until 14.475 GHz is reached. In particular, ten calibration frequency slots are defined, ranging from 14.00 GHz to 14.05 GHz, 14.05 GHz to 14.15 GHz, 14.10 to 14.15 GHz and so on. The center frequencies for these slots is as above, i.e., from 14.025 GHz, 14.075 GHz, 14.125 GHz and so on until 14.475 GHz is reached.

As described earlier, the pilot signal is at a frequency offset from the signal being transmitted by the antennas 12 and 14. Preferably, the offset is about 50 MHz from the frequency of the signal being transmitted by the antennas 12 and 14. More preferably, the offset is downward from the frequency of the signal being transmitted by the antennas 12 and 14.

The process further includes refining the calibration offset to account for the pilot signal frequency offset. Further refining the calibration offset includes using the calibration offset determined as described above. Specifically, operating the electronics 16 such that it uses the previously determined calibration offset and in the absence of input from the antennas 12 and 14. That is, allowing the system 10 to converge at the main signal frequency, while compensating for errors according to pilot signal measurements. That is, a pilot signal 42 is injected within the frequency range intended for use by the passive antennas 24 and 31. Upon completion of this convergence, a switch to passive mode is made. That is, there is no more compensating for errors and therefore the electronics 16 remains constant. The next part of the method is to change the pilot signal frequency to its ordinary value, typically 50 MHz below the main signal. The last part is measuring the difference between pilot signals that are obtained by this modification, i.e., injecting a pilot signal with no frequency offset and a pilot signal with a frequency offset, and storing these differences as the calibration offsets to be used thereafter.

Referring to FIG. 2, once the pilot signal 42 has been switched to a frequency with an offset (second frequency), the switch 48 switches the input into the signal measurement apparatus 33 from one signal interface 44 to the other 46. The difference in phase and amplitude in the pilot signal 52 with the second frequency between when it is switched from one signal interface 44 to the other 46 is thereafter stored and used as the calibration offset.

As with reception, the calibration offset for transmission is frequency dependent. Hence, the foregoing method or procedure is repeated over the intended frequency range of use for the antennas. More preferably, over a frequency range from 14 GHz to 14.5 GHz inclusively for transmission. Amplitude and phase differences are preferably determined at an increment of about 5 MHz over the foregoing frequency range, which is in the Ku band.

The procedure or method accounts for three types of errors in the antenna system 10 when used for transmission. First, the method accounts for differences or errors between the passive antennas 24 and 31, such as in the antenna interfaces 18 and 26 and in the antennas 12 and 14. Second, it accounts for errors due to injection of a pilot signal, such as the signal interfaces 44 and 46. Third, it accounts for errors caused by a frequency offset in the pilot signal 52.

An advantage of the foregoing process or method, is that some portions can be performed after installation of the antenna system 10 where it will be used, such as on a vehicle. The initial portion is preferably performed in an isolated environment, such as in an anechoic chamber. Differences due to frequency offset of pilot signals may be accounted for after installation of the antenna system 10. The advantage of doing this after installation, is that environmental factors of the particular installation will be accounted for in determining calibration offsets for this part of the method.

Another advantage is that it does not rely upon trial and error. Calibration offsets are determined based upon differences in amplitude and phase. It thus a deterministic method that does not require an iterative process to arrive at calibration offsets and hence can be readily automated.

Various changes and modifications can be made to the described embodiments without departing from the spirit and scope of the invention as will be recognized by those of ordinary skill in the art. For example, while the embodiments have been described showing a system with two antennas, it could be extended to systems having more antennas. The antennas 12 and 14 may be designed to operate in other bands, such as the Ka band and/or C band for example. The antennas 12 and 14 were described as overlaying one another. In other embodiments, the antennas could have other configurations, such as for instance, being formed side-by-side instead of being overlaid. Instead of determining calibration offsets based on phase and amplitude, the calibration offsets could be based on differences in time and slope. Since changes can be made as described, the present examples and embodiments are to be considered as illustrative and not restrictive and the invention is not to be limited to the details given herein, but may be modified within the scope and equivalence of the appended claims.

The invention claimed is:

1. A method for calibrating an antenna system having electronics and a pair of passive antennas for connection to the electronics in which modification control is applied to the electronics based upon a pilot signal injected into the electronics through a pair of signal interfaces when the electronics is being operated, the method comprising:
receiving a signal with the passive antennas and determining amplitude and phase differences in the received signal between the first and second passive antennas;
injecting a test signal to one of the signal interfaces and then the other and determining the amplitude and phase differences in the test signal between when it is injected to the one of the signal interfaces and the other; and
determining a calibration offset that is equal to the determined amplitude and phase differences in the test signal between when it is injected to the one of the signal interfaces and the other, subtracted from the determined amplitude and phase differences in the received signal between the passive antennas.

2. The method of claim 1, further comprising:
operating the electronics with the calibration offset determined in said determining a calibration offset in the absence of input from the antennas;
injecting a pilot signal having a first frequency;
applying modification control;
ceasing modification control;
changing the pilot signal to a second frequency offset from the first frequency and switching the pilot signal from one signal interface to the other;
determining the amplitude and phase differences at an output of the electronics between when the pilot signal with the second frequency is switched from the one signal interface to the other; and
using these differences resulting from said determining the amplitude and phase differences as the calibration offset.

3. The method of claim 1, further comprising repeating said receiving a signal, said supplying a pilot signal, and said determining a calibration offset over a plurality of frequencies.

4. The method of claim 3, wherein the plurality of frequencies range from 10.70 GHz to 12.75 GHz inclusively.

5. The method of claim 2, wherein the electronics include an active mode and a passive mode and said switching the pilot signal is performed in the passive mode.

6. The method of claim 5, wherein the signal is received over a range of frequencies from 10.70 GHz to 12.75 GHz inclusively.

7. The method of claim 1, wherein said receiving a signal is performed with the passive antennas in an anechoic environment without the passive antennas connected to the electronics.

8. A method for calibrating an antenna system having a first passive antenna and a second passive antenna and first and second signal interfaces, the method comprising:
supplying a signal to the passive antennas and determining amplitude and phase differences between transmissions of the first and second antennas;
passing a test signal through one of the signal interfaces and then the other and determining the amplitude and phase difference in the test signal between when it is passed through the one of the signal interfaces and the other;
determining a calibration offset that is equal to the determined amplitude and phase difference in the test signal between when it is passed through the one of the signal interfaces and the other, subtracted from the determined amplitude and phase difference in the transmissions between the first and second antennas.

9. The method of claim 8, wherein each passive antenna is for connection to electronics in which modification control is applied to the electronics based upon a pilot signals injected into the electronics and passing through the signal interfaces when the electronics is being operated, the method further comprising:
operating the electronics with the calibration offset determined in said determining a calibration offset in the absence of input from the antennas;
injecting a pilot signal having a first frequency;
applying modification control;
ceasing modification control;
changing the pilot signal to a frequency offset from the first frequency;
determining the amplitude and phase differences between when the pilot signal with the second frequency passes through the electronics and the first signal interface and the electronics and the second signal interface; and
using the differences resulting from said determining the amplitude and phase differences as the calibration offsets.

10. The method of claim 8, further comprising repeating said supplying a signal, said passing a test signal, and said determining a calibration offset over a plurality of frequencies.

11. The method of claim 10, wherein the plurality of frequencies range from 14 GHz to 14.5 GHz inclusively.

12. The method of claim 9, wherein the electronics include an active mode and a passive mode and said switching the pilot signal is performed in the passive mode.

13. The method of claim 9, wherein the offset is approximately 50 MHz.

14. The method of claim 9, wherein the second frequency is offset downward form the first frequency.

15. The method of claim 8, wherein said supplying a signal is performed in an anechoic environment.

16. The method of claim 9, wherein said determining the amplitude and phase differences includes switching the input into a signal measurement apparatus from one signal interface to another.

* * * * *